United States Patent
Shankar et al.

(10) Patent No.: US 8,966,283 B1
(45) Date of Patent: Feb. 24, 2015

(54) SYSTEMS AND METHODS FOR LIVE MIGRATION OF A DATA STORE TO ENCRYPTED FORM

(71) Applicant: Google Inc., Mountain View, CA (US)

(72) Inventors: Umesh Shankar, New York, NY (US); Ruoming Pang, New York, NY (US); Benjamin Valerian Pflanz, Fort Lee, NJ (US); Sarvar Patel, Montville, NJ (US); Darrell Kindred, Columbia, MD (US); Daniel Rebolledo Samper, New York City, NY (US)

(73) Assignee: Google Inc., Mountain View, CA (US)

( * ) Notice: Subject to any disclaimer, the term of this patent is extended or adjusted under 35 U.S.C. 154(b) by 55 days.

(21) Appl. No.: 13/768,207

(22) Filed: Feb. 15, 2013

Related U.S. Application Data (60) Provisional application No. 61/599,974, filed on Feb. 17, 2012.

(51) Int. Cl.
*G06F 7/22* (2006.01)
*G06F 12/14* (2006.01)
*G06F 12/06* (2006.01)

(52) U.S. Cl.
CPC .................................. *G06F 12/1408* (2013.01)
USPC .......................................... 713/191; 713/193

(58) Field of Classification Search
CPC . G06F 17/303; G06F 11/2082; G06F 3/0683; G06F 11/1435
See application file for complete search history.

(56) References Cited

U.S. PATENT DOCUMENTS

| | | | |
|---|---|---|---|
| 8,341,749 B2 | 12/2012 | Rogel | |
| 8,578,178 B2* | 11/2013 | Fujii et al. | 713/193 |
| 2008/0189297 A1* | 8/2008 | Schultz | 707/10 |
| 2011/0320805 A1* | 12/2011 | Chaves et al. | 713/150 |

OTHER PUBLICATIONS

Chang et al., "Bigtable: A Distributed Storage System for Structured Data", Journal ACM Transactions on Computer Systems (TOCS), vol. 26, Issue 2, Jun. 2008, Art. No. 4.

Google code, Protocol Buffers, Encoding, printed from internet Jan. 31, 2012, code.google.com/apis/protocolbuffers/docs/encoding.html.

Google code, Protocol Buffers, Language Guide, printed from internet Jan. 31, 2012, code.google.com/apis/protocolbuffers/docs/proto.html.

* cited by examiner

*Primary Examiner* — Venkat Perungavoor
(74) *Attorney, Agent, or Firm* — Fox Rothschild LLP (57) ABSTRACT

This document describes methods and systems by which a data storage service migrates a volume of stored data from an unencrypted format to an encrypted format while still permitting user access to the data. The encryption process uses migration markers to identify records that have undergone the encryption process. When migration is complete, the service removes the migration markers and retains the encrypted data in a data storage facility.

16 Claims, 5 Drawing Sheets

SYSTEMS AND METHODS FOR LIVE MIGRATION OF A DATA STORE TO ENCRYPTED FORM

RELATED APPLICATIONS

This application claims the priority benefit of U.S. Provisional Patent Application No. 61/599,974 filed on Feb. 17, 2012, the disclosure of which is incorporated herein by reference in its entirety.

BACKGROUND

The migration of large volumes of stored data to an encrypted format is time-consuming and cumbersome. Users of the data may desire to access the data while it is being encrypted. However, the data is typically offline during the encryption process, which causes inconvenience to the data users.

This document describes a method and system that addresses some or all of the above problems, and other problems.

SUMMARY

In an embodiment, a hosted storage service migrates a volume of data that is stored in a data store from an unencrypted format to an encrypted format while still permitting user access to the data. During the encryption process, the service may retrieve a data record from the data store, encrypt the data record, mark the encrypted data record with a migration marker, and store the encrypted data record with the migration marker in the data store. When the system determines that the encryption process has been performed on each of the data records in the set, the system may then perform a cleaning operation on the migrated data. The cleaning operation may include retrieving each encrypted data record that has a migration marker from the data store, removing each retrieved encrypted data record's migration marker, and returning each retrieved encrypted data record to the data store in an encrypted format without including the record's migration marker.

Optionally, when performing the cleaning operation, for each retrieved encrypted data record, the service may determine whether the record includes the migration marker. For any retrieved encrypted data record that does not include the migration marker, the service may return the retrieved encrypted data record to the data store unchanged.

When encrypting the data record, the service may identify an encryption key for the retrieved data record and use the key to encrypt the retrieved data record. Before identifying the encryption key, the service may first determine whether the retrieved data record includes the migration marker. If the retrieved data record already includes a migration marker and the service determines that the record is encrypted, the service may remove the migration marker from the record and decrypt the record for subsequent re-encryption.

Optionally, each migration marker may include a protocol buffer extension. The protocol buffer extension may include a tag number that is unique in that it is not used in the data store as a tag number for any purpose other than to identify migration markers.

While the encryption process is being performed, and optionally before the cleaning begins, if the service receives a request to access a requested data record in the data store, the service may determine whether the requested data record includes a migration marker. If the requested data record includes a migration marker, the service may remove the migration marker from the requested data record and return the requested data record without the migration marker to the requester. The data record may be decrypted before it is returned to the requester, or the requester may be provided with the applicable key to decrypt the record. If, during a similar period, the service receives a request to add a new data record to the data store, the service may encrypt the new data record, append a migration marker to the encrypted new data record, and store the encrypted new data record with its migration marker in the data store.

Any or all of the steps described above may be performed by one or more elements of a storage service system, such as a data store that stores a volume of data in unencrypted format, a processor, and a processor-readable storage medium containing programming instructions that, when executed, cause the processor to perform any of the steps described above.

DETAILED DESCRIPTION

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

Figure 1:
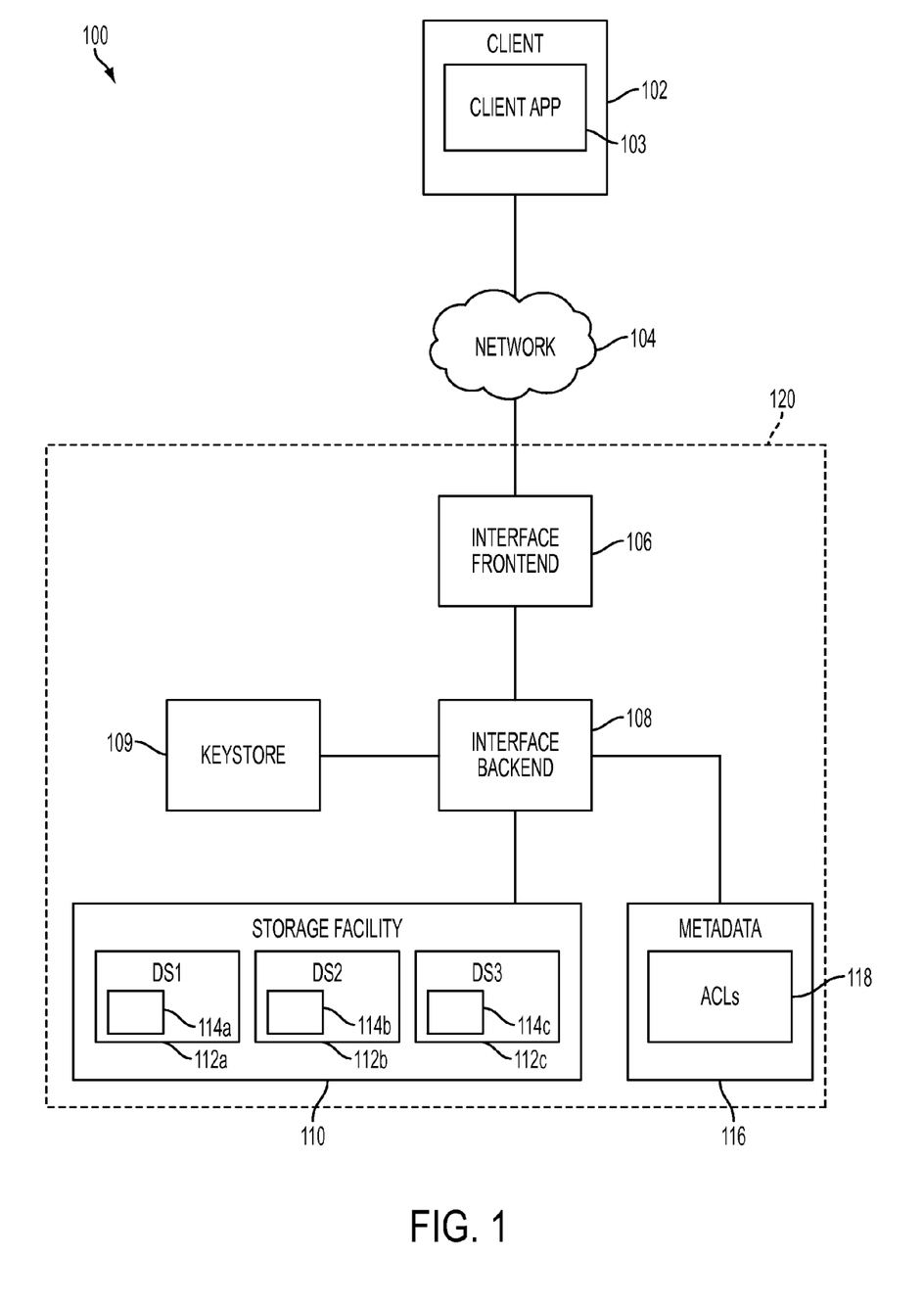
FIG. 1 is a block diagram illustrating example elements of a remote storage system that holds data for one or more client devices according to an embodiment.

Data storage facilities such as cloud computing storage facilities often store data for a large number of clients. To protect the integrity and ensure the privacy of each user's data, a data storage facility may store the data in an encrypted format. FIG. 1 illustrates one example of a system 100 that may transfer information between any number of client devices 102 and a hosted storage service 120 such as a cloud computing storage facility. In an embodiment, one or more client devices 102 may be connected to one or more communication networks 104. Each client device 102 may include a tangible, computer-readable memory on which is stored a client application 103.

The communication network 104 may be connected to a hosted storage service 120. The hosted storage service 120 stores data in one or more storage facilities 110, which are data servers that include a tangible, computer-readable memory to store data. Any of the storage facilities 110 may be scalable by including two or more individual data stores 112a-112c. The data stores may serve as backups to each other, or they may be taken on or offline to create a larger or smaller overall storage facility depending on demand. In some embodiments, one or more of the data stores may be used to store data 114a-114c. Data 114a-114c may be of a particular format. For example, data store 112a may store data 114a as Binary Large Object (BLOB) data, data store 112b may store data 114b in a distributed file system (e.g., Network File System), and data store 112c may store data 114c in a structured data format such as a database. This example is merely illustrative, and data stores 112a-112c may store data in any suitable format.

In various embodiments, the communication network 104 may be a local area network (LAN), a wide area network (WAN), a mobile or cellular communication network, an extranet, an intranet, the Internet and/or the like. In an embodiment, the communication network 104 may provide communication capability between the client device 102, an interface frontend device 106 and/or an interface backend device 108 of the hosted storage service 120. The client device 102 may communicate across the network 104 using any suitable communications protocol, such as Transmission Control Protocol/Internet Protocol (TCP/IP), Hypertext Transfer Protocol (HTTP), Secure Shell Remote Protocol (SSH), Application Program Interfaces (API), or any other suitable protocol.

In an embodiment, the hosted storage service may include an interface frontend device 106 which operates as a management server to receive requests from and send responses to the client device 102. The interface frontend device 106 may include a processor in communication with a computer-readable storage medium. The interface frontend device 106 may be in communication with one or more client devices 102 and/or the interface backend device 108. The interface frontend device 106, although depicted as a single computer system, may be implemented as a multiple devices. The interface frontend device 106 may receive messages (e.g., requests) from the client device 102 and parse the request into a format that can be used by the hosted storage service 120, such as a remote procedure call (RPC). The interface frontend device 106 may prepare responses generated by the hosted storage service 120 for transmission to the client 102.

In some embodiments, the interface frontend device 106 may include programming instructions configured to manage uploads and downloads of large files. This may include functionality such as pausing, resuming, and recovering an upload from time-out. The interface frontend device 106 may monitor load information and update logs, for example to track and protect against denial of service (DOS) attacks.

Some or all of the data resources stored in each storage facility 110 may be stored in encrypted format or unencrypted format. Data resources that are stored in encrypted format may be associated with one or more encryption keys that are stored in and/or provided by a keystore facility 109, which is a tangible memory that manages the issuance of encryption keys. Any or all of the stored data resources also may be associated with metadata 116 that is stored on a tangible, computer-readable memory.

The interface backend device 108 may include a processor in communication with a computer-readable storage medium. The interface backend device 108 may be in communication with one or more client devices 102 and/or the interface frontend device 106. The interface backend device 108, although depicted as a single computer system, may be implemented as multiple devices. The interface backend device 108 may operate as an authentication server to handle authentication of client requests, manage data resources and metadata, and key retrieval and distribution. In some embodiments, data management may be primarily or fully performed by the interface backend device 108, while external communications may be primarily or fully performed by the interface frontend device 106. Thus, in such embodiments, the interface backend device 108 may isolate the data resources from the client/facing interface frontend device 106 until authentication is performed.

The interface backend device 108 manages metadata 116 associated with the data resources that are in the storage facility 110. For example, a client may request access to a data resource using a data identifier, and the metadata may map the identifier to one or more of the data stores 112a-112c that store the resource. The metadata also may include information such as resource creation times, information about one or more groups or categories to which the resource belongs, resource size, hashes, and access control lists (ACLs) 118 for the resources and groups, or other suitable information. The interface backend device 108 may log activity for each resource, such as information about who accessed each resource and times of access.

The ACLs 118 may identify which users are authorized to perform actions on data resources or groups of data resources, and/or what actions may be performed on each resource or group. As used in this document, a user may be an individual, a software application or service, an item of hardware, or another identifier such as an invite token or an application identifier.

Moving large volumes of an unencrypted data format to an encrypted format has been challenging in prior art systems because the system must be able to serve live data while the data store is partially encrypted and partially unencrypted. The data could be taken offline and converted, but such a process would be time consuming, and would render users unable to access their data during the migration process.

The methods described in this document permit the system to serve live data while the data store is partially encrypted and partially unencrypted. The methods allow operations that write data to the data store during the encryption process without corrupting the data store. The methods described in this document may be used with distributed databases that do not reside on a single machine, and/or that are not under the control of a single process.

Figure 2:
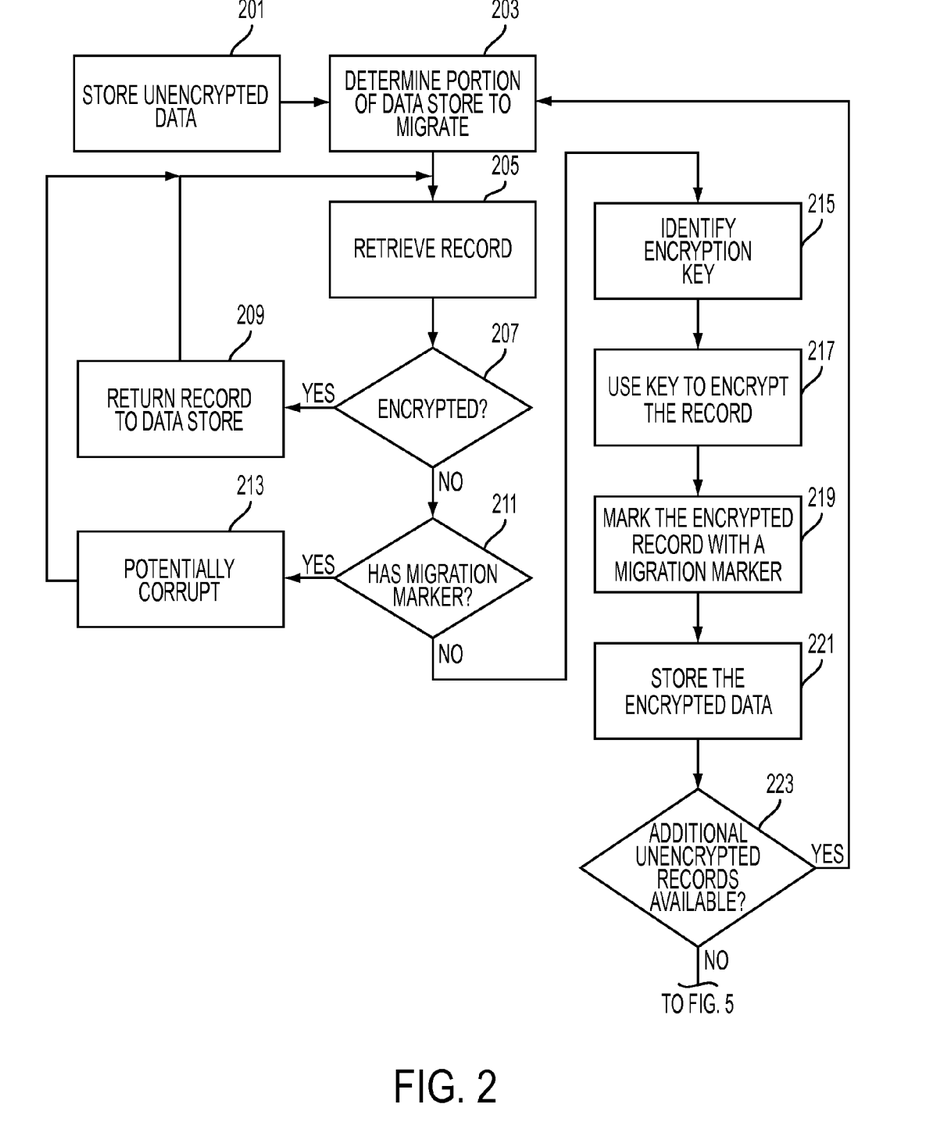
FIG. 2 is a flow diagram illustrating example steps that a migration phase of an encryption migration process may perform according to an embodiment.

FIG. 2 illustrates several steps that may be performed when a computing system converts a data store's unencrypted data to an encrypted format. A storage service may house a volume of data in a data store 201, such as one or more databases that are stored on one or more tangible, computer-readable memory devices. At least some of the data will be in an unencrypted format, such that the volume of data includes a set of unencrypted data records. Optionally, the system may determine whether to migrate all or only a portion of the data store to an encrypted format 203. The determination may be performed in response to a user selection, based on a determination that a volume or number of unencrypted records in a data store sector has exceeded a threshold, or based on any other method.

A processor will encrypt the unencrypted data in the selected section (or the entire data store, as applicable) by retrieving a data record from the data store 205. It may determine whether the record is encrypted 207, and if so return the record to the data store 209. As used in this document, phrases such as "return the record to the data store" or "storing the record in the data store" may include returning the record to the same data store from which the record was retrieved, or returning the record to a data store that is different (or a data store sector that is different) from the data store or sector from which the record was retrieved. If the system confirms that the record is unencrypted, it may also determine whether the unencrypted record contains a migration marker 211. If so, it may identify the record as potentially corrupt 213 and discard, archive or quarantine the file for further analysis. Alternatively, the presence of a migration marker may serve as a basis for determining that the file is encrypted. If so, the system may remove the migration marker, unencrypt the record, and then return the record to the data store for re-encryption (or simply re-encrypt it) with a new migration marker.

If the system confirms that the file is unencrypted and not corrupt, it may identify an encryption key for the retrieved data record 215, use the key to encrypt the retrieved data record 217, mark the encrypted data record with a migration marker 219, and store the encrypted data record with the migration marker in the data store 221. The migration marker is an indicator that is appended or added to an encrypted data file to indicate its encryption status. If the system determines that additional unencrypted records remain in the data store 223, the system may repeat this process until all records in the data store have been encrypted.

Figure 3:
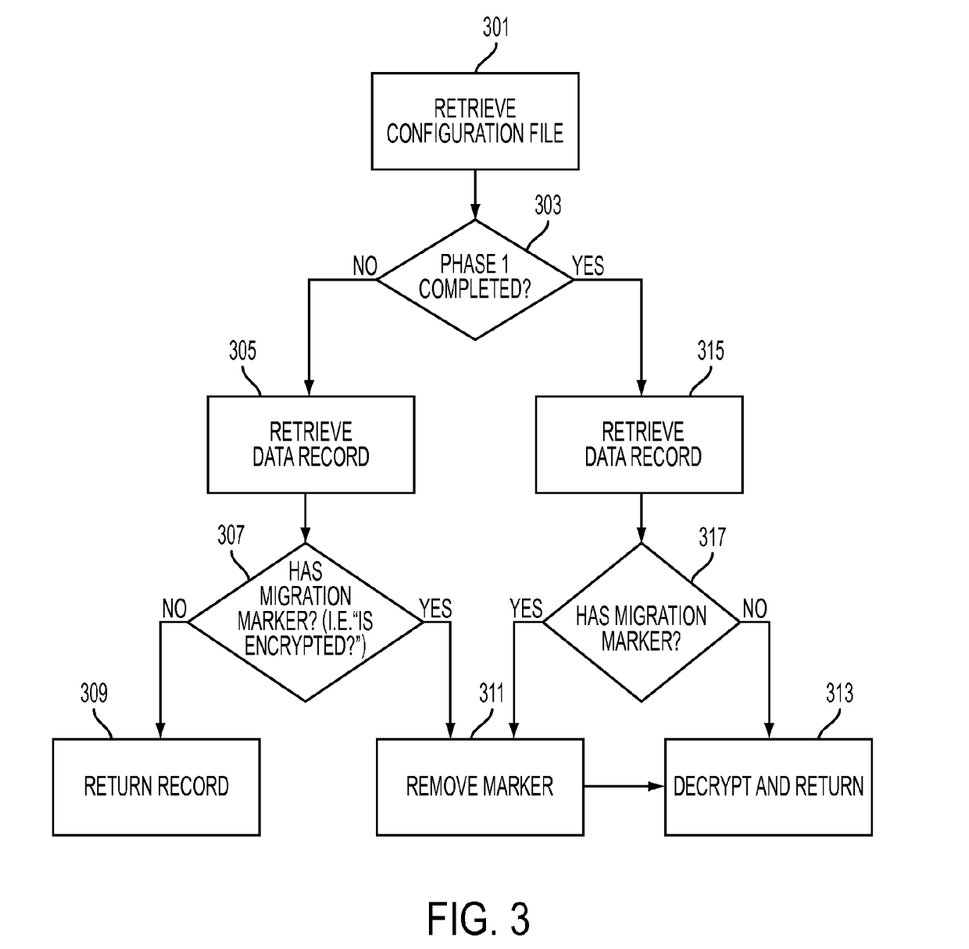
FIG. 3 is a flow diagram illustrating how a storage system may handle data access requests during an encryption migration process according to an embodiment.

While migration is occurring, the storage facility may receive data access requests, as well as new data to be stored in the facility. FIG. 3 illustrates how the storage service may mediate data access requests during the migration process. When an authorized service or user requests access to a data record, the service may retrieve a global configuration file or information from the global configuration file 301. If the facility identifies 303 that the first phase of the migration process is still underway (e.g., that described above with respect to FIG. 2), it will retrieve the requested data record from the data store 305 and determine whether the data record already includes a migration marker 307. If the data record does not yet include the migration marker, the system will presume that the record is not yet encrypted, and it will simply return the record to the requester 309. If the migration marker is appended to the data record, the system will remove the marker 311 and then decrypt the record and return it to the requester 313. After the migration phase is complete (e.g., during a cleanup phase that will be described below in the context of FIG. 5), when the system retrieves a data record 315 and determines that it still has an appended migration marker 317, the system will remove the migration marker 311 before decrypting the record and returning the record to the requester 313. If no migration marker is appended, the record may simply be decrypted and returned to the requester 313.

Figure 4:
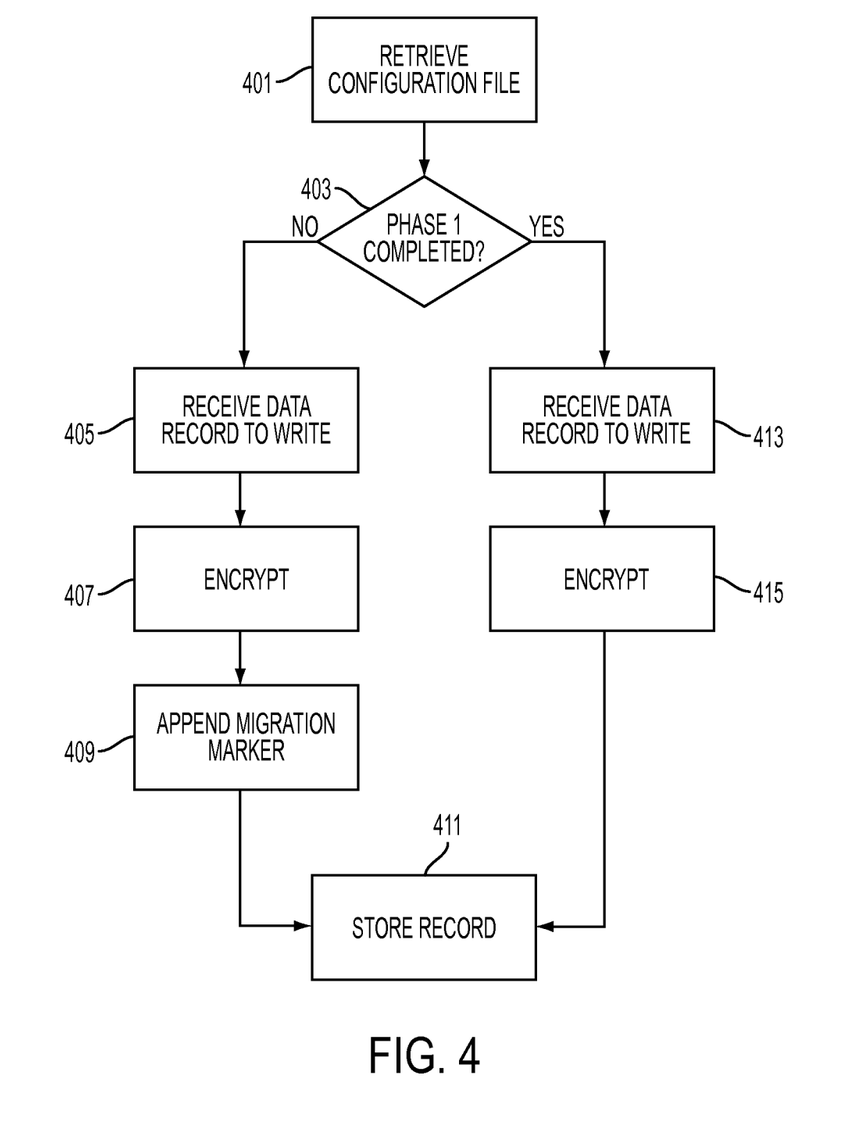
FIG. 4 is a flow diagram illustrating how a storage system may handle new data uploads during an encryption migration process according to an embodiment.

FIG. 4 illustrates how the storage service may mediate data upload requests during the migration process. When an authorized service or user requests that a data record be uploaded or modified, the service may retrieve a global configuration file or information from the global configuration file 401. If the facility determines 403 that the first phase of the migration process is still underway (e.g., that described above with respect to FIG. 2), the system will receive the data record that will be written to the data store 405, encrypt it 407, and append a migration marker to the data file 409. The encrypted file will then be stored 411 in a data store with the migration marker. On the other hand, if the first phase of the migration process is complete, the system will receive the data record that will be written to the data store 413, encrypt it 415, and store it 411 in the data store without appending a migration marker.

In the processes described above with respect to FIGS. 3 and 4, the global configuration file may include data indicating whether the migration phase is still in progress. The mediation of the data access and uploading, and the updating of the global configuration file, can be done by various elements or combinations of elements of the storage service, such as in the interface backend (e.g., as a software layer), in or as an extension of the storage facility or any individual data store, or as a stand-alone service, process or other component between the interface backend and the data stores.

Figure 5:
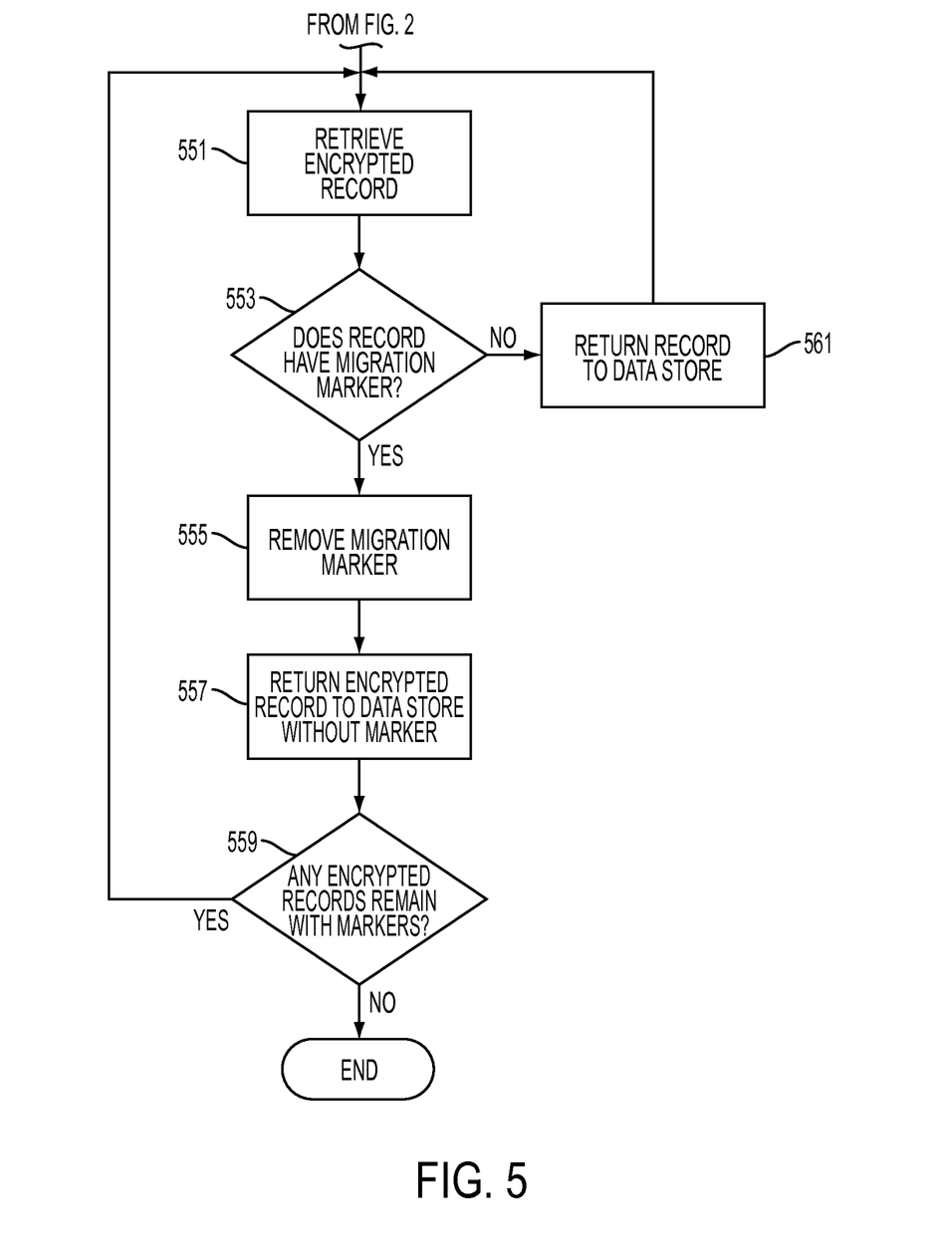
FIG. 5 is a flow diagram illustrating example steps that a cleanup phase of an encryption migration process may perform according to an embodiment.

Referring to FIG. 5, after determining that no unencrypted records remain in the data store, the migration phase will be complete, and the system may perform a cleaning operation by retrieving each encrypted data record from the data store 551 and determining whether the record includes a migration marker 553. If the record does not have a migration marker, the system may return the record to the data store unchanged 561. If the record does have a migration marker, the system may remove the migration marker from the encrypted record 555, and then return the encrypted data record to the data store in encrypted format without the migration marker 557. The system may determine whether any encrypted records with migration markers remain in the database 559, and if so it may repeat the process for the remaining records.

While performing the steps described above, each data record may remain available for access and modification by authorized users and services. If, during the migration process of FIG. 2, the user accesses a record to which a migration marker has not yet been appended, the record will be migrated after the user releases the file. If, during the cleaning process of FIG. 5, the user accesses a record to which a migration marker has been appended, the record will be cleaned after the user releases the file.

When adding a migration marker to an encrypted data record, the system may use any of multiple techniques for appending a marker to a data record. Only encrypted records are intended to contain the marker, as the marker serves as an indication of encryption status. In an embodiment, the system may add each migration marker to its corresponding data record as a protocol buffer extension. A protocol buffer is a mechanism for serializing structured data, such as that contained in a database. The protocol buffer may include a set of protocol buffer messages, each of which is a small logical record of information that includes one or more key-value pairs. Each key may indicate a type of value (e.g., numeric, floating point, Boolean, byte string) and a tag number for the field. The type defines what keys are allowed for the specific type. If so, the marker may be a protocol buffer extension having a tag number that no other protocol buffer message type uses.

For example, the system may store an encrypted protocol buffer with a protocol buffer message such as:
message EncryptedProto {
// Raw encrypted bytes obtained by serializing the original protocol
// buffer in the standard way and encrypting the result with the
// encryption key
optional bytes raw_ciphertext=1;
// Migration marker
extensions 123456789;
}
In the example above, the migration marker is defined as:
extend EncryptedProto {
optional bytes migration_marker=123456789;
}

The tag number of the protocol buffer (123456789 in the example above) may be used as the migration marker. The tag number/migration marker is unique in that it is not used to store any other extension, for example that for application-specific data.

As an example of an encrypted record with a migration marker, consider the following encrypted data record:

0a 09 65 6e 63 72 79 70 74 65 64 aa d1 f9 d6 03 00

This record may be parsed into the following components:

0a-09: These segments indicate that the first entry in the protocol buffer is a string of bytes in field #1 (raw ciphertext) and that there are nine bytes in total in that field.

65 6e 63 72 79 70 74 65 64: This sequence represents the actual encrypted bytes, that is, the encrypted representation of the original protocol buffer.

aa d1 f9 d6 03--00: This is the migration marker itself. The first part (aa d1 f9 d6 03) indicates that this is field number 123456789 and that it contains a byte array. In this example, the marker payload is an empty string (the final 00), but other values are possible.

Since the tag number of the marker is unique, no other original protocol buffer may contain it, and therefore it is possible to distinguish an encrypted record from an unencrypted record.

The above-disclosed features and functions, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. A method, comprising:
   storing, by a data store of a storage service, a volume of data in an unencrypted format, wherein the volume includes a set of unencrypted data records;
   by a processor of the storage service, performing an encryption process while the volume of data remains available for user access, the encryption process comprising:
      retrieving a data record from the data store,
      encrypting the data record,
      marking the encrypted data record with a migration marker that indicates the encrypted data record's encryption status, wherein the migration marker comprises a protocol buffer extension, the protocol buffer extension comprising a tag number that is unique in that it is not used in the data store as a tag number for any purpose other than to identify migration markers, and
      storing the encrypted data record with the migration marker in the data store; and
   determining that the encryption process has been performed on each of the data records in the set.

2. The method of claim 1, further comprising, by the processor after the determining is complete, performing a cleaning operation comprising:
   retrieving each encrypted data record that has a migration marker from the data store;
   removing, from each retrieved encrypted data record, the record's migration marker; and
   returning each retrieved encrypted data record to the data store in an encrypted format without including the record's migration marker.

3. The method of claim 2, wherein the cleaning operation further comprises:
   for each retrieved encrypted data record, determining whether the record includes the migration marker; and
   for each retrieved encrypted data record that is determined to not include the migration marker, returning the retrieved encrypted data record to the data store unchanged.

4. The method of claim 1, wherein encrypting the data record comprises:
   identifying an encryption key for the retrieved data record; and
   using the key to encrypt the retrieved data record.

5. The method of claim 4, further comprising, for each retrieved record before identifying the encryption key:
   determining whether the retrieved data record includes the migration marker;
   if the retrieved data record includes the migration marker, removing the migration marker from the record, determining that the record is encrypted, and decrypting the record to yield the retrieved data record in unencrypted format.

6. The method of claim 1, further comprising, while the encryption process is being performed:
   receiving a request to access a requested data record in the data store;
   determining whether the requested data record includes a migration marker;
   if the requested data record includes a migration marker, removing the migration marker from the requested data record; and
   returning the requested data record without the migration marker to the requester.

7. The method of claim 1, further comprising, while the encryption process is being performed:
   receiving a request to add a new data record to the data store;
   encrypting the new data record;
   appending a migration marker to the encrypted new data record; and
   storing the encrypted new data record with its migration marker in the data store.

8. A method, comprising:
   storing, by a data store of a storage service, a volume of data in unencrypted format, wherein the volume includes a set of unencrypted data records;
   by a processor of the storage service, performing an encryption process while the volume of data remains available for user access, the encryption process comprising:
      retrieving a data record from the data store,
      encrypting the data record,
      marking the encrypted data record with a migration marker that indicates the encrypted data record's encryption status, wherein the migration marker comprises a protocol buffer extension, the protocol buffer extension comprising a tag number that is unique in that it is not used in the data store as a tag number for any purpose other than to identify migration markers, and
      storing the encrypted data record with the migration marker in the data store;
   determining that the encryption process has been performed on each of the data records in the set; and
   performing a cleaning operation comprising:
      retrieving each encrypted data record that has a migration marker from the data store, removing, from each retrieved encrypted data record, the record's migration marker, and returning each retrieved encrypted data record to the data store in an encrypted format without including the record's migration marker.

9. The method of claim 8, wherein the cleaning operation also comprises:

for each retrieved encrypted data record, determining whether the record includes the migration marker; and for each retrieved encrypted data record that is determined to not include the migration marker, returning the retrieved encrypted data record to the data store unchanged.

10. The method of claim 8, wherein encrypting the data record comprises:

identifying an encryption key for the retrieved data record; and using the key to encrypt the retrieved data record.

11. The method of claim 10, further comprising, for each retrieved record before identifying the encryption key:

determining whether the retrieved data record includes the migration marker;

if the retrieved data record includes the migration marker, removing the migration marker from the record, determining that the record is encrypted, and decrypting the record to yield the retrieved data record in unencrypted format.

12. A system, comprising:

a data store that stores a volume of data in unencrypted format, wherein the volume includes a set of unencrypted data records;

a processor; and a processor-readable storage medium containing programming instructions that, when executed, cause the processor to:

perform an encryption process comprising:

retrieving a data record from the data store, encrypting the data record, marking the encrypted data record with a migration marker that indicates the encrypted data record's encryption status, wherein the migration marker comprises a protocol buffer extension, the protocol buffer extension comprising a tag number that is unique in that it is not used in the data store as a tag number for any purpose other than to identify migration markers, and storing the encrypted data record with the migration marker in the data store; and determining that the encryption process has been performed on each of the data records in the set.

13. The system of claim 12, wherein the programming instructions, when executed, also cause the processor to perform a cleaning operation comprising:

retrieving each encrypted data record that has a migration marker from the data store;

removing, from each retrieved encrypted data record, the record's migration marker; and returning each retrieved encrypted data record to the data store in an encrypted format without including the record's migration marker.

14. The system of claim 13, wherein the programming instructions that, when executed, cause the processor to perform the cleaning operation comprise instructions for:

for each retrieved encrypted data record, determining whether the record includes the migration marker; and for each retrieved encrypted data record that is determined to not include the migration marker, returning the retrieved encrypted data record to the data store unchanged.

15. The system of claim 12, wherein the programming instructions that, when executed, cause the processor to encrypt the data record comprise instructions for:

identifying an encryption key for the retrieved data record; and using the key to encrypt the retrieved data record.

16. The system of claim 15, wherein the programming instructions, when executed, for each retrieved record before identifying the encryption key, also cause the processor to:

determine whether the retrieved data record includes the migration marker;

if the retrieved data record includes the migration marker, remove the migration marker from the record, determine that the record is encrypted, and decrypt the record to yield the retrieved data record in unencrypted format.

* * * * *